(12) United States Patent
Haugs et al.

(10) Patent No.: US 7,259,544 B2
(45) Date of Patent: Aug. 21, 2007

(54) LOAD SYMMETRIZATION WITH CONTROLLABLE INDUCTOR

(75) Inventors: Espen Haugs, Sperrebotn (NO); Frank Strand, Moss (NO); Bjørnar S. Johansen, Moss (NO)

(73) Assignee: Magtech AS (NO)

( * ) Notice: Subject to any disclaimer, the term of this patent is extended or adjusted under 35 U.S.C. 154(b) by 285 days.

(21) Appl. No.: 10/968,845

(22) Filed: Oct. 19, 2004

(65) Prior Publication Data

US 2006/0082354 A1    Apr. 20, 2006

(30) Foreign Application Priority Data

Oct. 14, 2004  (GB) ................... 0422867.2

(51) Int. Cl.
*H01F 17/00*  (2006.01)
*H02M 5/06*  (2006.01)

(52) U.S. Cl. ..................................... 323/355

(58) Field of Classification Search .................. 363/2, 363/3, 148, 149, 152–154; 323/205, 207, 323/208, 215, 218, 355, 356, 364

See application file for complete search history.

(56) References Cited

U.S. PATENT DOCUMENTS

| | | |
|---|---|---|
| 2,883,604 A | 4/1959 | Mortimer |
| 3,053,920 A | 9/1962 | Seitz |
| 4,347,449 A | 8/1982 | Beau |
| 4,393,157 A | 7/1983 | Roberge et al. |
| 4,689,735 A | 8/1987 | Young et al. |
| 5,525,894 A * | 6/1996 | Heller ................ 322/20 |
| 5,889,667 A * | 3/1999 | Bernet ................ 363/127 |
| 6,781,342 B2 * | 8/2004 | Tolbert et al. .......... 318/784 |
| 7,091,704 B2 * | 8/2006 | Chou et al. ............. 323/207 |

FOREIGN PATENT DOCUMENTS

| | | |
|---|---|---|
| DE | 32 17 879 | 11/1983 |
| DE | 3927437 A1 | 4/1991 |
| FR | 2 344 109 | 7/1977 |
| GB | 479112 A | 1/1938 |
| GB | 716973 | 10/1954 |
| GB | 1 209 253 | 10/1970 |
| SU | 1156192 A | 5/1985 |
| WO | 01/90835 | 11/2001 |
| WO | 02/27898 | 4/2002 |
| WO | 02/45101 | 6/2002 |
| WO | 04/040598 | 5/2004 |
| WO | 04/053615 | 6/2004 |

OTHER PUBLICATIONS

International Search Report for International Application No. PCT/NO2005/000385 mailed May 11, 2006 (5 pgs.).
PCT Written Opinion for PCT/NO2005/000385 mailed May 11, 2006 (7 pgs.).

\* cited by examiner

*Primary Examiner*—Matthew V. Nguyen
(74) *Attorney, Agent, or Firm*—Kirkpatrick & Lockhart Preston Gates Ellis LLP

(57) ABSTRACT

A method for compensation and symmetrization of a three-phase system with a single-phase load is provided. At least one variable inductor for connection to the three-phase system is employed in the method. The inductor's inductance is adjusted to obtain a resistive single-phase load and/or a three-phase load which draws balanced line currents. A device and a system for compensation and symmetrization by means of variable inductors is also provided.

17 Claims, 5 Drawing Sheets

LOAD SYMMETRIZATION WITH CONTROLLABLE INDUCTOR

CROSS-REFERENCE TO RELATED APPLICATIONS

This application claims priority to Great Britain Patent Application No. 0422867.2 filed on Oct. 14, 2004. The entire contents of this application is incorporated herein by reference.

1. Introduction/Technical Field

The present invention is related to electric three-phase power distribution and describes more specifically a method, a device and a system for symmetrization the line currents drawn from a three-phase power source delivering power to a single-phase connected between a second and a third phases of said power source.

In the present application, the expression "load compensation" describes an operation where circuit components are connected in parallel and/or series to the load in order to provide a mainly resistive load. If the original load is capacitive, inductive components will be used and vice versa. The term "symmetrization" is used to describe a process where one or several reactive components are added to a three-phase system to achieve symmetric line currents, that is currents with the same amplitude and with a phase difference of 120 degrees.

2. Background Art

Compensation and symmetrization of single-phase loads is necessary to limit losses due to reactive currents, to avoid unsymmetrical line currents (achieve a stable network), to avoid generator oversizing and thermal derating or overheating.

A practical example of a situation where symmetrization is necessary is heating of flow lines in oil production, where power in the MW range is fed by a single-phase in a three-phase system. Current from a feeding generator must be balanced to a very high degree to prevent breakdown.

According to one prior art technique, a single-phase load, e.g. an inductive load in a first branch of a three-phase delta configuration, is compensated by means of a parallel capacitor and symmetrized by an inductor and a capacitor in the remaining branches. The inductor and the capacitor are connected in different branches. This form of symmetrization can only be carried out for a constant load, as the traditional symmetrization components are constant (constant capacitors and inductors). Besides, only components with low tolerances in their values can be used, as there is no possibility for compensating deviations from nominal value in the symmetrization components after the system is assembled.

It is not obvious that the exact value of the load impedance is known prior to design. If the (large and expensive) symmetrization and compensation components are designed based on incorrect data for the load, the chosen components must be replaced. This is because deviations in the actual load from the estimated load used as a design parameter cannot be compensated for in the assembled system.

Besides, the impedance value of a capacitor varies with time, and because of this it must be checked regularly in order to discover and correct for possible changes.

If the load impedance changes, one must accept an imbalance in the current drawn from the three phase source, or change inductance and/or capacitance in discrete steps. If a perfect load-match is impossible to get because of the discrete settings of the capacitance and inductance, one still has unbalanced load currents. In addition, this discrete solution is not trivial and simple.

SUMMARY OF THE INVENTION

These shortcomings related to prior art solutions can be reduced by means of the invention, which comprises variable (adjustable) inductors (and/or capacitors). Said variable inductors are preferably of the type described in PCT/NO012/00217 which is hereby incorporated by reference. Adjustable capacitors can be implemented by means of said inductors connected in parallel with fixed value capacitors to provide a variable capacitive load. The present invention aims at reducing the shortcomings described above by using one or more variable inductors, preferably in combination with capacitors, to control the reactive current and power delivered by the power source.

More specifically, the invention is related to a method for symmetrization of the line currents drawn from a three-phase power source delivering power to a single-phase load connected between a second and a third phases of said power source, comprising the steps of connecting a variable inductor and a capacitor in parallel between a first and a third phase of the power source, connecting a variable inductor between a first and a third phase of the power source, and adjusting the inductance of the adjustable inductors until symmetrical currents are drawn from the power source.

For purely resistive loads variable inductors will be used only for symmetrization. Inductive and capacitive loads, on the other hand, must preferably be compensated before symmetrization takes place. Compensation will preferably be performed by connection of an inductor and/or a capacitor in parallel with the load.

According to a preferred embodiment of the invention at least one inductor or capacitor connected in parallel with the load is a variable component that is adjusted until the resulting combined impedance of the load and the compensating component or components is purely resistive, i.e. with no reactive component.

Preferably, the variable component is a variable inductor of the type described in the publication referenced above. If the single-phase load is capacitive, the variable inductor's inductance is adjusted so that the inductor and the capacitive load together provide a resistive load.

If the single-phase load is inductive, however, it will be necessary to use a variable capacitor, or to connect a capacitor in parallel with the load and the variable inductor, making it possible to adjust the resulting impedance so that the resulting impedance is purely non-reactive.

In one embodiment, the method according to the invention comprises providing a variable inductive voltage drop by connecting a variable inductor to each phase in the three-phase system. This will ensure that each phase of the power source can be reduced and adjusted to deliver the same voltage to the three phases of the symmetrized load. If the inductors are properly designed, they reduce the voltage without introducing significant harmonics. Variable inductors in series with each phase of the power source may also limit inrush currents during start up and possible short circuit currents during fault.

In one embodiment of the invention, symmetrization is achieved by adjusting the system's current balance (that is, providing three currents with the same amplitude and 120 degrees phase lag) by adjusting the variable components connected between the first and second phase and between the first and third phase of the power source, respectively.

In an alternative embodiment, the method comprises measuring power, current and power factor drawn by the three-phase system and adjusting the variable inductance of the inductors based on these values and reference values. Alternatively, the variable inductance of the inductors could be adjusted based on impedance values of the single-phase load and reference values for power, current and power factor for the three-phase system.

The invention also comprises a device for symmetrization of the line currents drawn from a three-phase power source delivering power to a single-phase load connected between a second and a third phases of said power source, comprising at least one variable inductor and a capacitor in parallel for connection between a first and a third phase of the power source, and a variable inductor for connection between a first and a third phase of the power source, where the inductors' inductance is adjusted to draw symmetrical currents from the power source.

In one embodiment, said device comprises a capacitor and/or an inductor for connection in parallel with the single-phase load. In a variant of this embodiment, at least an inductor or a capacitor connected in parallel with the load is a variable component that is adjusted until the resulting combined impedance of the load and the compensating component(s) is active, and more specifically in one embodiment said variable component is a variable inductor and a capacitor that are both connected in parallel with each other and with the single-phase load.

According to another feature of the invention, the device comprises devices for providing a variable inductive voltage drop by connecting a variable inductor to each phase in the three-phase system.

According to one embodiment the device comprises devices for adjusting the inductors' inductance, said devices being adapted for of measuring the admittance between said second and third phase and adjusting the inductance of the variable inductors towards a value that will result in admittances with a magnitude of $1/\sqrt{3}$ of said measured admittance between the first and the second phase and between the first and the third phase respectively.

In one embodiment of the invention the device comprises devices for measuring power, current, voltage and/or power factor drawn by the three-phase load and adjusting the variable inductance(s) of the inductor(s) and/or capacitor(s) based on these values and reference values.

In another embodiment, the device comprises devices for adjusting the variable inductance(s) of the inductor(s) based on impedance values of the single-phase load and reference values for power, current, voltage and power factor for the three-phase system.

The invention also comprises a system for symmetrization of the line currents drawn from a three-phase power source delivering power to a single-phase load connected between a second and a third phases of said power source by means of a device according to the invention, the system comprising:
- a measuring unit for power, current, voltage and/or power factor drawn by the three-phase system,
- an input unit for reference values of power, current/ voltage and/or power factor,
- a processing unit for adjusting the variable inductance of the inductor(s) based on measured and reference values.

To be able to estimate whether a symmetrization is successfully performed or not it is necessary to measure at least two phase currents.

Finally, the invention comprises a system for symmetrization of the line currents drawn from a three-phase power source delivering power to a single-phase load connected between a second and a third phases of said power source, comprising:
- an input unit for impedance values of the single-phase load,
- an input unit for reference values of power, current, voltage and/or power factor,
- a processing unit for adjusting the variable inductance of the inductor based on measured and reference values.

Changes in the single-phase load will be compensated by means of the corresponding variable inductor, and symmetrization of the compensated system will be performed by means of other variable inductors.

The invention also permits compensation/symmetrization in case of component ageing (changes in impedance) and tolerances.

Once the load is symmetrized and compensated, it is in most cases necessary to adjust the voltage of the load. This is extremely difficult with thyristor/triac AC control. High frequency or line frequency AC/AC or DC/AC converters are also considered cumbersome or impossible to use to control the load voltage. The main problem is that the compensation and symmetrization components are calculated for operation at a given frequency. All the above mentioned solutions introduce either intentionally or non-intentionally high frequency content in the supply voltage.

The necessary characteristics of the variable inductors are calculated to ensure proper operation of the application, and the characteristics are used in a control algorithm implemented in electronics used to operate the variable inductors.

DETAILED DESCRIPTION

Figure 1:
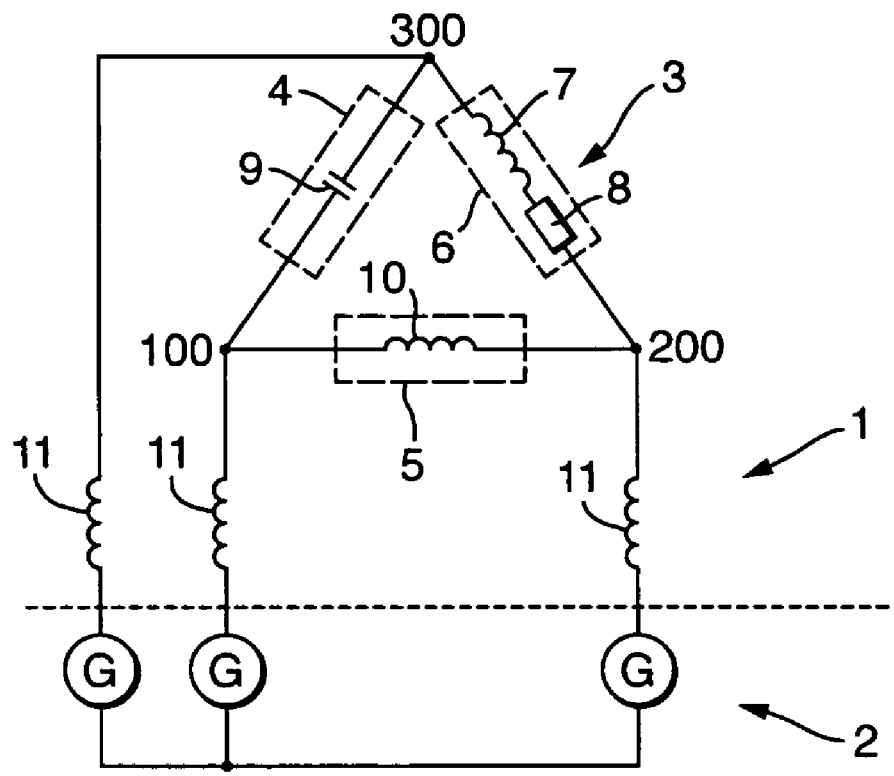
FIG. 1 shows a prior art three-phase system.

FIG. 1 shows a three-phase system 1 connected to a three-phase power source 2. System 1 comprises three branches 3, 4, 5 connected in delta configuration. A single-phase load 6, which in this example comprises an inductor 7 and a resistor 8, is connected in branch 3. This single-phase load 6 is symmetrized by means of a capacitor 9 in one branch and an inductor 10 in the other branch. Capacitor 9 and inductor 10 are constant. This configuration will, as mentioned before, lead to errors due to changes in the capacitance and load with time and to tolerances in the components' value. System 1 also comprises variable inductors 11, for voltage control.

Figure 2:
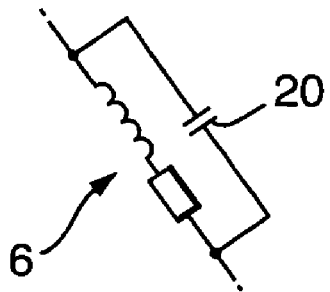
FIG. 2 shows a compensation circuit.

FIG. 2 shows a circuit for direct compensation of single-phase load 6. In this case a capacitor 20 is used, adapted for providing a mainly resistive load in combination with single-phase load 6. Again this configuration requires precisely determined values for the single-phase load and low tolerances.

Figure 3:
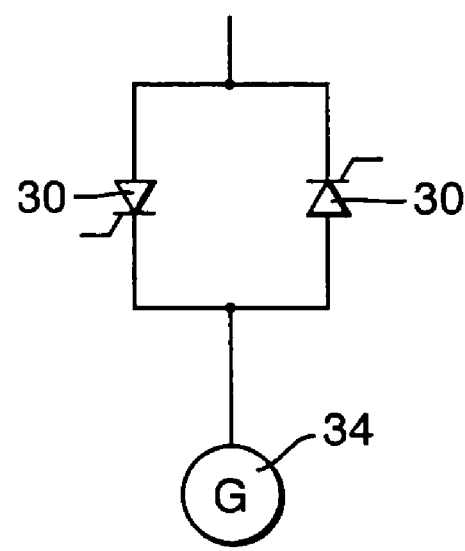
FIG. 3 illustrates voltage control with SCR (thyristors/triac).

FIG. 3 shows another approach to voltage control. Here, two thyristors 30 are connected in anti-parallel and in series with the generator 31, thus replacing inductors 11 in FIG. 1.

Figure 4:
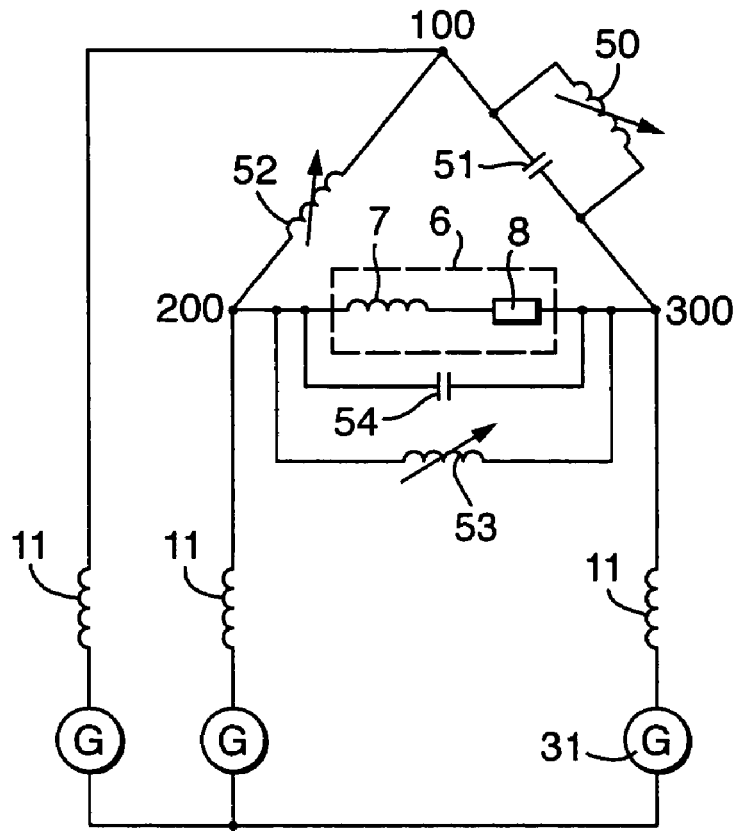
FIG. 4 shows a device according to one embodiment of the invention.

FIG. 4 shows a device according to one embodiment of the invention, where an inductor 53 and a capacitor 54 are connected in parallel with the single-phase load 6. The purpose is to provide a variable capacitive circuit connected in parallel with the load, and this is achieved not by using a variable capacitor, but by using a fixed capacitor that pulls the total load over to the capacitive side and a variable inductor that adjustably pulls the total load back towards the inductive side. This arrangement permits an adjustment of the resulting load until it reaches a real, or purely resistive, value. This arrangement also permits easy adjustment of the compensating load to varying values of single-phase load 6 due to tolerances, errors, changes with time etc., and to a varying value of the compensation capacitor 54 due to tolerances, and/or aging.

According to this embodiment of the invention, the three-phase system (excluding the variable inductors 11 used for voltage control) is connected in delta configuration, with the single-phase load 6 connected between a second and a third phase 200, 300 respectively, a capacitor 51 and a parallel variable inductor 50 connected between a first and a third phase 100 and 300 respectively and a variable inductor 52 connected between the second and the first phase 200 and 300 respectively. Inductor 52 and inductor 50 will be adjusted to achieve a symmetric three-phase load.

The terms first, second and third phase are used in this context to identify the different phases and not necessarily as an expression of the phases relative sequence.

It is also possible to implement the device by means of other combinations of variable inductors, as e.g. by one inductor 50 (and capacitor 51) in one branch and an inductor 52 in the other, and no inductors in the load 6 branch.

The adjustment of the compensation network is fairly straightforward. If a negative phase angle Φ is measured for the load branch, the load is inductive and the adjustable inductor 53 in the load branch should be reduced, and vice versa.

Figure 5:
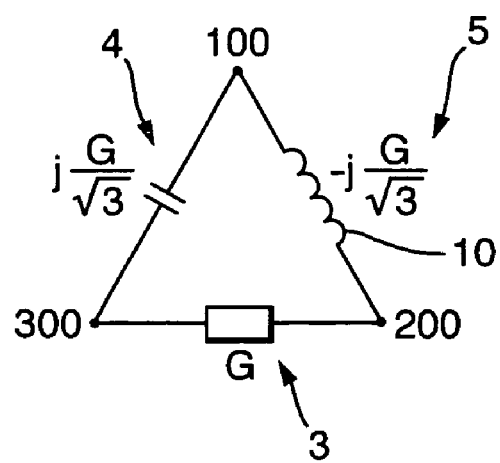
FIG. 5 illustrates adjustment of the symmetrization branches.

The adjustment of the symmetrization branches is somewhat more complicated. In the following example it will be assumed that the load branch has been successfully compensated, and that the load is real. Correct symmetrization demands that the load admittance G should be √3 times larger than the susceptance of the capacitive and the inductive branches, as illustrated in FIG. 5. For the inductive branch the sign should be negative.

The inductive branch includes only one adjustable inductor (52 in FIG. 4), and consequently the admittance for this branch is $$Y_{ind} = B_{ind} = \frac{-1}{\omega \cdot L_{ind}}. \quad (1)$$

By measuring the impedance, and thereby the admittance of the load branch, a target value for the inductive branch can be established as $$Y_{ind\_target} = \frac{-1}{\sqrt{3}} \cdot |YL|, \quad (2)$$

where YL is the load admittance. By measuring the load admittance YL and the admittance of the inductive branch, $Y_{ind}$, an error signal for the inductive branch err_L can be found as $$\text{err\_L} = Y_{ind\_target} - Y_{ind} = \frac{-1}{\sqrt{3}} |YL| + \frac{1}{\omega \cdot L_{ind}}. \quad (3)$$

Consequently, if err_L is positive, $L_{ind}$ must be increased, and vice versa.

Adjustment of the capacitive branch is done in the same way. Since the capacitive branch includes a capacitor (51 in FIG. 4) and an adjustable inductor (50 in FIG. 4) in parallel, the admittance for this branch is $$Y_{cap} = B_{cap} = \frac{\omega^2 \cdot L_c \cdot C - 1}{\omega \cdot L_c}. \quad (4)$$

The target admittance for this branch is the same as for the inductive branch, but with the opposite sign $$Y_{cap\_target} = \frac{1}{\sqrt{3}} \cdot |YL|. \quad (5)$$

The error signal err_C is then $$\text{err\_C} = Y_{cap\_target} - Y_{cap} = \frac{1}{\sqrt{3}} |YL| - \frac{\omega^2 \cdot L_c \cdot C - 1}{\omega \cdot L_c}. \quad (6)$$

Which means that if err_C is positive, the inductor in the capacitive branch, $L_C$, must be increased. If err_C is negative, $L_c$ must be reduced.

Figure 6:
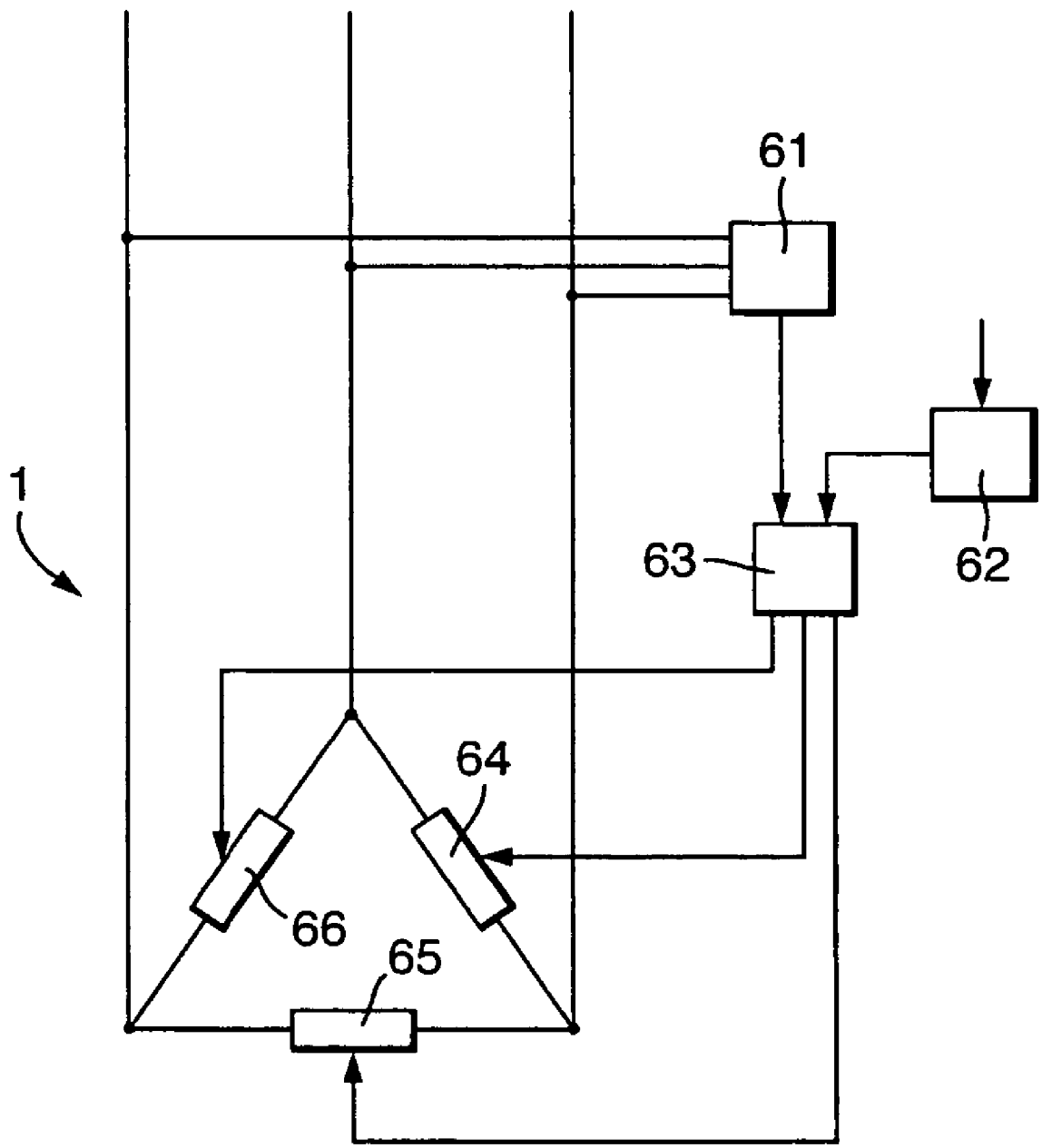
FIG. 6 shows a symmetrization system according to the invention

FIG. 6 shows a system for symmetrization of a three-phase system 1 with a single-phase load 66 by means of a device according to the invention. The symmetrization system comprises:

a measuring unit 61 for power, current, voltage and/or power factor drawn by the three-phase system 1, an input unit 62 for reference values of power, current, voltage and/or power factor, a processing unit 63 for adjusting the variable inductance of the inductor(s), based on measured and reference values.

Figure 7:
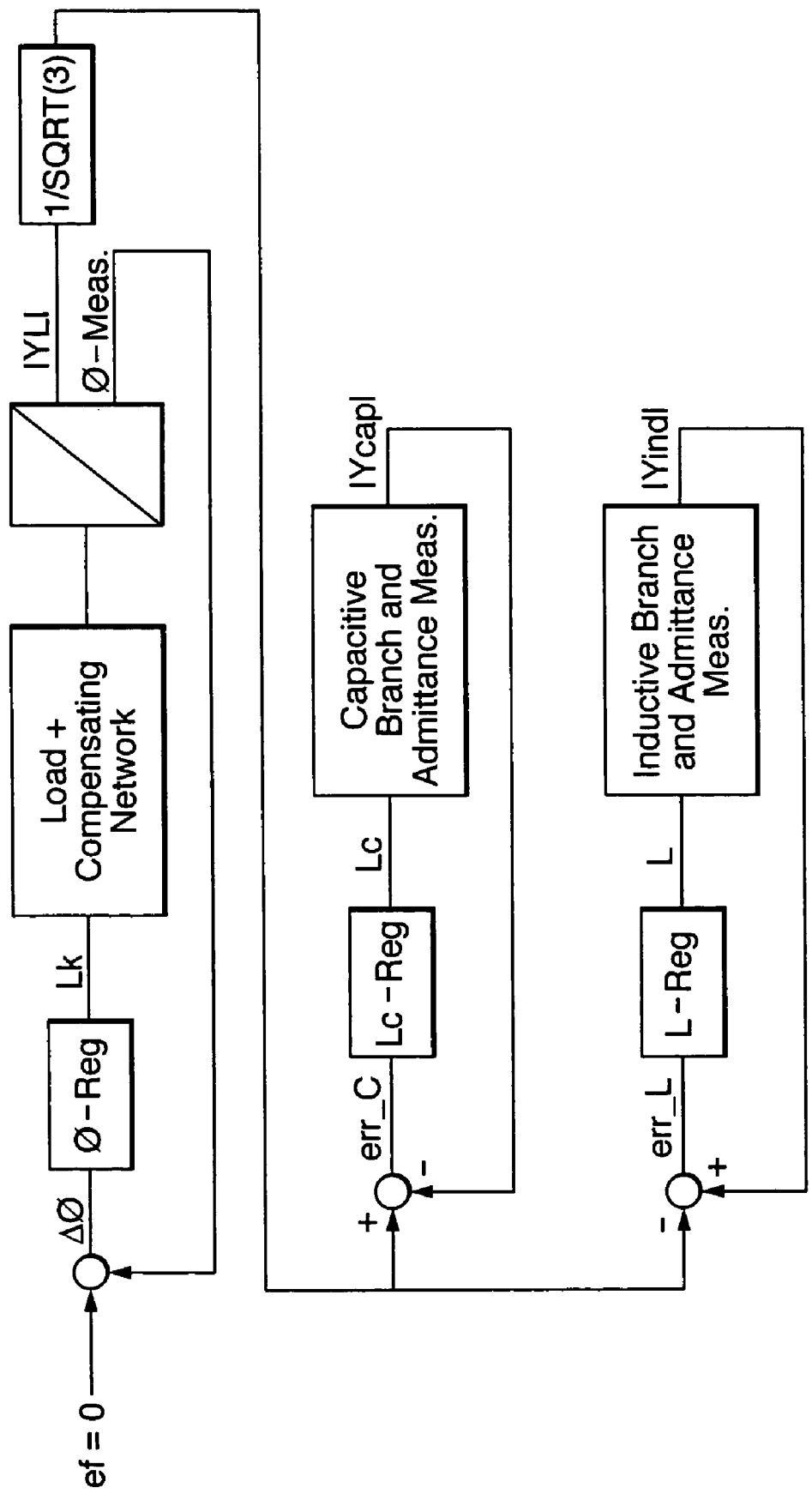
FIG. 7 shows a regulation feedback circuit.

FIG. 7 shows a regulation feedback circuit that may be part of the regulated system of FIG. 6. In this case the reference value is a reference phase angle Φ-ref of 0 degrees. This reference value is compared with a measured phase angle between voltage and current through the load as measured by the measuring unit 61, and the difference is fed into a controller that will adjust the adjustable inductor of the load branch in accordance with the sign and optionally also the magnitude of this phase angle difference.

In addition to measuring the phase angle, the measuring unit 61 also measures the load admittance YL. The magnitude of this admittance is divided by $\sqrt{3}$ by the processing unit 63 and the result is used as reference value for the regulation of the adjustable inductances in the capacitive and inductive branches. These values are compared with the measured values for the magnitude of the admittance $Y_{cap}$ in the capacitive branch and $Y_{ind}$ of the inductive branch respectively, and the sign and optionally the magnitude of the calculated error is used by controllers that will adjust the inductance of the adjustable inductors in these branches as described above.

Figure 8:
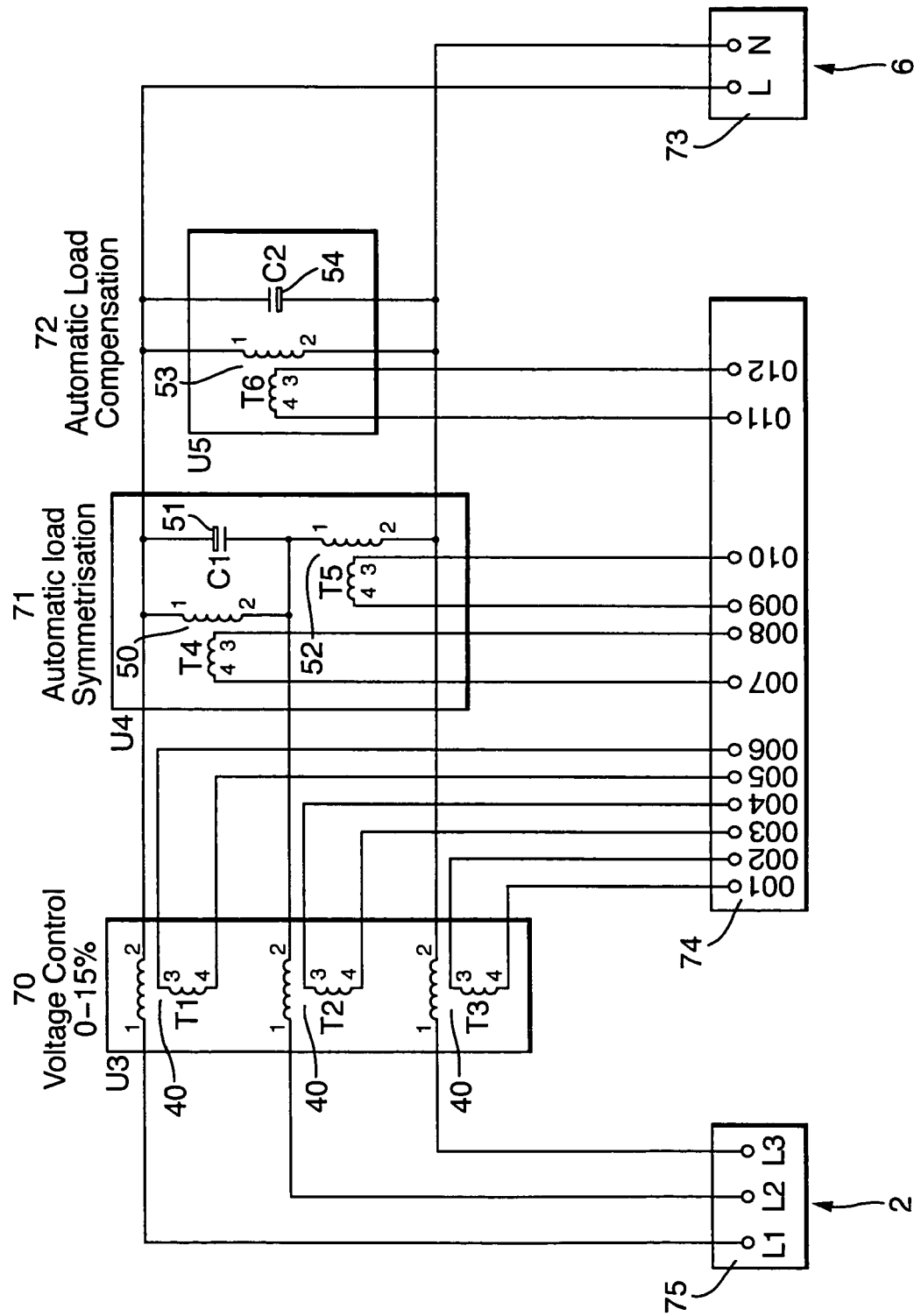
FIG. 8 shows an embodiment of the invention adapted for flow line heating.

As mentioned above, a practical application for the invention is flow line heating, where the temperature of pipes for oil production should either be kept constant at a predetermined value, or be heated. In this application the pipes are directly heated by electricity, where the pipe itself is the single phase load. This pipe load is represented by an inductive impedance which must to be compensated and symmetrized to be connected to a generator. An embodiment of the invention adapted for this application is shown in FIG. 8.

The pipe to be heated (single-phase load 6) is connected to L and N (72) and the power source 2 to L1, L2, L3 (2). As mentioned earlier, the variable inductors are preferably of the type described in PCT/NO01/00217, that is they comprise one main winding which acts as the inductor itself, and a control winding for regulation of the inductance by changing permeability in inductor cores. Control signals to adjust the permeability of the inductor cores are connected to connector 74.

The figure shows three modules. The first is a voltage control module 70 comprising variable inductors 40 connected to all three phases of the source 2. The second module 71 performs the automatic load symmetrization by means of two variable inductors 50, 52 and one capacitor 51. The third module 72 performs automatic load compensation by means of one variable inductor 53 and a capacitor 54.

The solution with variable inductors makes it easier to get appropriate capacitors, since the problem with tolerances can be compensated by adjusting the inductances.

With a variable inductor (and/or a capacitor) one can adjust the symmetrization and compensation components continuously to ensure a 100% balanced and active load.

By introducing variable inductors in series with the source, one can reduce the voltage of the symmetrized load.

What is claimed is:

1. Method for symmetrization of the line currents drawn from a three-phase power source delivering power to a single-phase load connected between a second and a third phases of said power source, comprising:
   connecting a variable inductor and a capacitor in parallel between a first and a third phase of the power source,
   connecting a variable inductor between a first and a second phase of the power source, and
   adjusting the inductance of the adjustable inductors until symmetrical currents are drawn from the power source.

2. Method according to claim 1, wherein the single-phase load is a reactive load, which is compensated by connecting a capacitor and/or an inductor in parallel with the single-phase load.

3. Method according to claim 2, wherein at least an inductor or a capacitor connected in parallel with the load is a variable component that is adjusted until the resulting combined impedance of the load and the compensating component(s) is active.

4. Method according to claim 3, wherein said variable component is a variable inductor and a capacitor that are both connected in parallel with each other and with the single-phase load.

5. Method according to claim 1, comprising providing a variable inductive voltage drop by connecting a variable inductor to each phase in the three-phase system.

6. Method according to claim 1, wherein the step of adjusting further includes the step of measuring the admittance between said second and third phase and adjusting the inductance of the variable inductors towards a value that will result in admittances with a magnitude of $1/\sqrt{3}$ of said measured admittance between the first and the second phase and between the first and the third phase respectively.

7. Method according to claim 1, comprising measuring power, current, voltage and/or power factor drawn by the three-phase load and adjusting the variable inductance(s) of the inductor(s) and/or capacitor(s) based on these values and reference values.

8. Method according to claim 1, comprising, adjusting the variable inductance(s) of the inductor(s) based on impedance values of the single-phase load and reference values for power, current, voltage and power factor for the three-phase system.

9. Device for symmetrization of the line currents drawn from a three-phase power source delivering power to a single-phase load connected between a second and a third phases of said power source, comprising at least one variable inductor and a capacitor in parallel for connection between a first and a third phase of the power source, and a variable inductor for connection between a first and a second phase of the power source, where the inductors' inductance is adjusted to draw symmetrical currents from the power source.

10. Device according to claim 9, comprising a capacitor and/or an inductor for connection in parallel with the single-phase load.

11. Device according to claim 10, wherein at least an inductor or a capacitor connected in parallel with the load is a variable component that is adjusted until the resulting combined impedance of the load and the compensating component(s) is active.

12. Device according to claim 11, wherein said variable component is a variable inductor and a capacitor that are both connected in parallel with each other and with the single-phase load.

13. Device according to claim 9, comprising devices for providing a variable inductive voltage drop by connecting a variable inductor to each phase in the three-phase system.

14. Device according to claim 9, comprising devices for adjusting the inductors' inductance, said devices being adapted for of measuring the admittance between said second and third phase and adjusting the inductance of the variable inductors towards a value that will result in admittances with a magnitude of $1/\sqrt{3}$ of said measured admittance between the first and the second phase and between the first and the third phase respectively.

15. Device according to claim 9, comprising devices for measuring power, current, voltage and/or power factor drawn by the three-phase load and adjusting the variable inductance(s) of the inductor(s) and!or capacitor(s) based on these values and reference values.

16. Device according to claim 9, comprising devices for adjusting the variable inductance(s) of the inductor(s) based on impedance values of the single-phase load and reference values for power, current, voltage and power factor for the three-phase system.

17. System for symmetrization of the line currents drawn from a three-phase power source delivering power to a single-phase load connected between a second and a third phases of said power source by means of a device according to claim 9, comprising:

a measuring unit for power, current, voltage and/or power factor drawn by the three-phase system, an input unit for reference values of power, current/voltage and/or power factor, a processing unit for adjusting the variable inductance of the inductor(s) based on measured and reference values.

* * * * *